Figure 1:
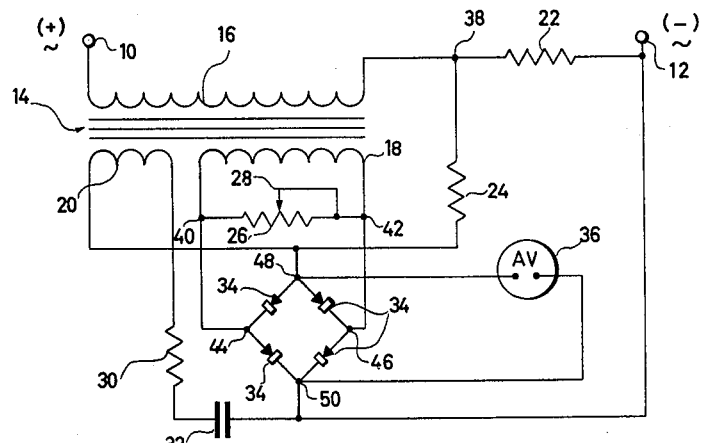

Dec. 1, 1959   L. ZWICKER ET AL   2,915,706
METHOD AND APPARATUS FOR MEASURING ELECTRIC QUANTITIES
Filed May 3, 1957

INVENTORS:
Ludwig Zwicker
Johannes Brenner

BY *[signature]*
Agents

United States Patent Office 2,915,706
Patented Dec. 1, 1959

2,915,706

METHOD AND APPARATUS FOR MEASURING ELECTRIC QUANTITIES

Ludwig Zwicker and Johannes Brenner, both of Nurnberg, Germany, assignors to Metrawatt Aktiengesellschaft, Nurnberg, Germany Application May 3, 1957, Serial No. 657,474

Claims priority, application Germany May 11, 1956

4 Claims. (Cl. 324—115)

This invention relates to a method and an apparatus for measuring electric quantities, and more particularly to methods and apparatus for measuring direct and alternating currents and/or voltages.

Multiple measuring apparatus for measuring direct and alternating currents and/or voltages are in general so constructed that the current measurement is carried out in a Feussner circuit, and the series resistances for voltage measurement are connected in the lowest current range of the Feussner circuit. By means of a current-type switch the measuring instrument is then connected in the Feussner circuit either through a rectifier circuit for measuring alternating quantities or directly through series resistances of appropriate value for measuring direct currents or voltages.

The disadvantage of such an arrangement is not only that, for known reasons different scales must be used for direct and alternating current measurements, but also on changing from alternating current to direct current measurement and vice versa a special switch must be operated.

In order to avoid the disadvantage of the different scales for the two types of current to be indicated, it is known to introduce transformers for the alternating current measurement which are so dimensioned in connection with the circuit that the alternating current scale coincides with the direct current scale within the required order of accuracy.

Circuits are also known which operate without current-type switches and in which the direct current scale coincides with the alternating current scale within the order of accuracy.

Thus, arrangements are known in which alternating measuring current is prevented from entering the direct current measuring circuit by means of a choke, whilst the direct measuring current is diverted from the alternating current measuring circuit by means of said current transformer.

The use of chokes in such measuring arrangements, however, involves numerous disadvantages.

Thus, for example, the multiple measuring apparatus becomes heavy, bulky and apart from the increased cost also awkward to handle due to the "built-in choke."

Again, the introduction of chokes also involves disadvantages from the point of view of circuit technique. Thus, if the choke is to separate the measuring alternating current from the direct current measuring section to a sufficient extent (corresponding to the required degree of accuracy) within the frequency range for which the apparatus is intended, then it must have an appropriately high impedance which is only possible by using a relatively great number of turns and a large quantity of core iron.

If, however, the choke arranged in the direct current measuring circuit is omitted in order somewhat to avoid the disadvantages described above, then during alternating current measurement there additionally passes through the moving coil meter an alternating current which converts the pulsating direct current utilised for measuring purposes into a pulsating direct current whose amplitude (due to the superimposed alternating current) alternately increases and decreases. This is a substantial disadvantage, since due to such a current, which corresponds to the output of a half-wave rectifier, the meter tends readily to vibrate at the conventional measuring frequencies, for example of 50 or 16⅔ cycles and moreover approximately twice the peak voltage is applied to the rectifier.

It is therefore an object of the present invention to avoid the special switches which have been hitherto provided in measuring apparatus of the kind described hereinabove.

It is another object of the present invention to provide a measuring instrument having a common scale for measurements of direct and alternating quantities.

It is a further object of the present invention to provide a measuring instrument of the kind described hereinabove which operates without chokes.

It is still another object of the present invention to provide a measuring apparatus which is not heavy and bulky.

Figure 2:
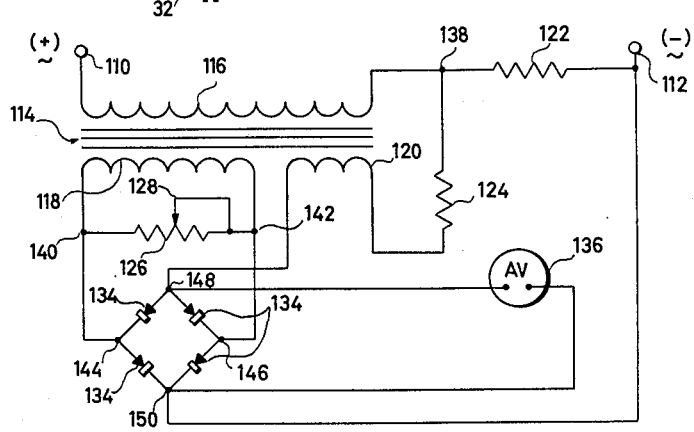
Figure 3:
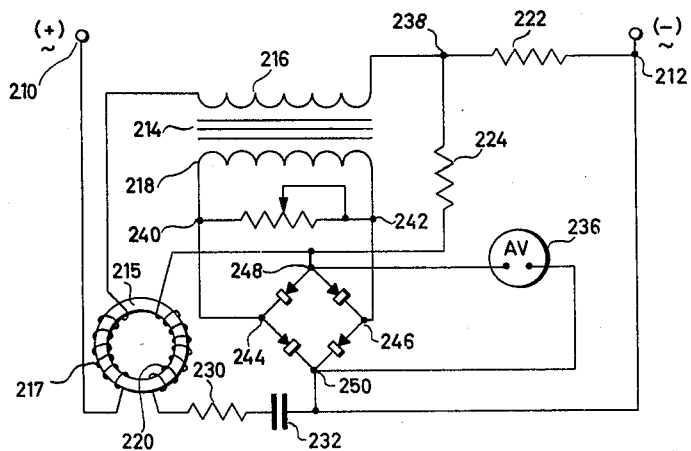

Other objects and advantages of the present invention will become apparent from the following detailed description thereof in connection with the accompanying drawing showing, by way of example, three embodiments of the present invention. In the drawing Fig. 1 is a wiring diagram of a first embodiment of the present invention, Fig. 2 is a wiring diagram of a second embodiment of the present invention, and Fig. 3 is a wiring diagram of a third embodiment of the present invention.

Referring now to the drawings, and first to Fig. 1, a terminal 10 is connected with a primary winding 16 of a transformer 14 which is connected over a resistor 22 with a second terminal 12. An electric quantity such as a direct or alternating current or a voltage is applied to the terminals 10 and 12, the terminal 10 being adapted to be connected with the positive terminal of a D.C. voltage source (not shown). The junction 38 of the primary winding 16 and the resistor 22 is connected with a resistor 24 connected in series with a compensating secondary winding 20 of the transformer 14. The compensating secondary winding 20 is connected through a resistor 30 with a condenser 32 connected with the terminal 12. A main secondary winding 18 of the transformer 14 is shunted by a resistor 26 having a contact 28 adapted to slide on the resistor 26 so as to render the latter adjustable. Terminals 40 and 42 of the secondary winding 18 and the resistor 26 are connected, respectively, with the terminals 44 and 46 of a four terminal network designed as a full wave rectifier 34 having further terminals 48 and 50 connected, respectively, with the junctions of the compensating secondary winding 20 and the resistor 24 and of the condenser 32 and the terminal 12. A measuring instrument 36 measuring currents or voltages is connected with the terminals 48 and 50.

The operation of this device is as follows:

Any direct current applied to the terminals 10, 12 causes a voltage drop across the resistor 22 which is measured by the measuring instrument 36 connected over the resistor 24 in parallel to the resistor 22. On the other hand any alternating current applied to the terminals 10, 12 is measured by the measuring instrument 36 which is connected through the full wave rectifier 34 with the secondary winding 18 of the transformer 14.

The interference current flowing through the meter 36 during alternating current measurements in consequence of the direct current circuit is cancelled by means of an oppositely-phased alternating current of preferably equal magnitude which is applied to the full wave rectifier 34 by the compensating secondary winding 20 over the resistor 30 and the condenser 32. In consequence thereof the original characteristic of the pulsating current flowing through the meter 36 is restored.

In order to prevent the measuring instrument 36 from being effectively shunted by the compensating winding 20 the latter should have a relatively high resistance value or the blocking condenser 32 should be connected between the compensating winding 20 and the terminal 50 of the full wave rectifier 34 with which the measuring instrument 36 is connected.

The sensitivity of the circuit measuring the alternating current relative of that of the circuit measuring the direct current is balanced by means of the variable resistor 26 allowing the sensitivity for alternating current measurements to be adjusted so as to correspond substantially to the sensitivity for direct current measurements.

Referring now to Fig. 2 of the drawings, an embodiment of the invention is shown in which the elements corresponding to the elements 10, 12 etc. of Fig. 1 are respectively denoted by 110, 112 etc. The compensating winding 120 of the transformer 114 is connected so that the alternating voltage produced by it prevents a current flow through the measuring instrument 136. However, in its electrical performance the circuit shown in Fig. 2 has the advantage over the circuit shown in Fig. 1 that whereas the alternating current generated in the compensating secondary winding 20 flows through additional parallel resistors, no additional resistors are provided in the embodiment shown in Fig. 2. The compensating winding 120 provides in this case a voltage which is substantially equal and oppositely phased to the voltage across the resistor 122. In this manner it is achieved that practically no alternating current flows in the compensating circuit including the compensating winding 120 and the resistor 122 so that no power is required for the compensating circuit. It should merely be noted that a resistor such as 124 should be connected in series with the compensating winding 120 of the transformer 114 the resistance value of which should be suitably chosen so as to reduce the temperature error of the circuit 122, 124, 120 measuring the direct component of the current.

Referring now to Fig. 3 of the drawings, a further embodiment of the invention is shown in which the elements corresponding to the elements 10, 12 etc. of Fig. 1 are respectively denoted by 210, 212 etc. In this case, however, the compensating voltage is produced by a separate transformer 215 of which the primary winding 217 is connected in series with the primary winding 216 of the transformer 214 whereas the secondary winding is connected over a resistor 230 and a condenser 232 to the terminals 248 and 250 of the full wave rectifier essentially in the same way as the compensating winding 20 is connected in the embodiment shown in Fig. 1 to the terminals 48 and 50 of the full-wave rectifier over the resistor 20 and the condensor 32. The working of the embodiment according to Fig. 3 is essentially similar to that of the embodiment shown in Fig. 1. It will be obvious to those skilled in the art that a separate transformer similar to the transformer 215 of Fig. 3 may also be used instead of the compensating winding 120 of the embodiment shown in Fig. 2. It is further to be remarked that the transformer 215 of Fig. 3 may be replaced by any four-terminal network which is adapted to supply an appropriate compensating voltage across its output terminals in response to the measuring current which is introduced into the input terminals.

Thus, there is provided an arrangement for multiple measuring apparatus which has consequently improved electrical performance relative to the known construction whereby the choke hitherto usual with its large weight, is superfluous and all the advantages are attained in that there is merely provided an additional transformer winding which in practice only inconsequentially increases the size of the transformer.

Thus, the rectified alternating voltage applied to the meter corresponds completely to that which would exist if the direct current measuring circuit were not present.

We have described hereinabove preferred embodiments of a multiple electrical measuring instrument. However we wish it to be understood that numerous changes and alterations, such as substitutions of equivalents may be made in the apparatus described hereinabove without departing in any way from our invention which is defined in the accompanying claims.

As used in the claims, the terms "current" and "voltage" shall be considered to be interchangeable. With reference to Fig. 1 for example, the instrument 36 indicates voltage if the measured quantity applied to the terminals 10 and 12 is voltage. If on the other hand, such quantity is current rather than voltage, the instrument 36 nevertheless still indicates voltage, namely the voltage drop across resistor 22 produced by direct current or the alternating voltage induced in the main secondary winding 18 by such current. Conversely, the instrument 36 may be regarded as a current measuring device, which indicates the current flowing therethrough responsive to the input quantity applied to the terminals 10 and 12, whether current or voltage.

We claim:

1. Apparatus for measuring the magnitude of alternating and direct voltages, comprising a direct current instrument for indicating said magnitudes; a transformer having a primary and at least one secondary winding; an input circuit for application thereto of said voltages and including said primary and also a resistor; direct current means, including said instrument and shunting said resistor, for producing desired indication by said instrument of the magnitude of direct voltage applied to said input circuit, and for incidentally applying undesired alternating voltage to said instrument upon application of alternating voltage to said input circuit; means for rectifying alternating voltage delivered by said one secondary responsive to application of alternating voltage to said input circuit; means to apply said rectified voltage to said instrument to provide indication by the latter of the magnitude of the last-mentioned alternating voltage; and circuit means inductively coupled to said input circuit for applying to said instrument, responsive to said last-mentioned voltage, an alternating voltage of substantially equal magnitude and opposite phase to said undesired alternating voltage, thereby substantially to cancel said undesired alternating voltage.

2. Apparatus according to claim 1, wherein the inductively coupled circuit means is connected in parallel with the instrument and includes a second secondary winding of the aforesaid transformer for coupling to the aforesaid input circuit.

3. Apparatus according to claim 1, wherein the inductively coupled circuit means comprises a second transformer having a primary winding included in the aforesaid input circuit and a secondary winding connected to the instrument.

4. Apparatus according to claim 1, wherein the inductively coupled circuit means includes a second secondary winding of the aforesaid transformer intercoupling the aforesaid input circuit and instrument, said second secondary being included in the aforesaid direct current means in series relation with said instrument.

References Cited in the file of this patent
UNITED STATES PATENTS 2,470,644    Redman _____ May 17, 1949